US010447070B2

(12) United States Patent
Qin et al.

(10) Patent No.: US 10,447,070 B2
(45) Date of Patent: Oct. 15, 2019

(54) SOLAR ENERGY SYSTEM WITH BUILT-IN BATTERY CHARGER AND ITS METHOD

(71) Applicants: Yu Qin, Troy, OH (US); Shanshan Du, Troy, OH (US)

(72) Inventors: Yu Qin, Troy, OH (US); Shanshan Du, Troy, OH (US)

(73) Assignees: Yu Qin, Troy, OH (US); Shanshan Du, Troy, OH (US)

( * ) Notice: Subject to any disclaimer, the term of this patent is extended or adjusted under 35 U.S.C. 154(b) by 232 days.

(21) Appl. No.: 15/615,581

(22) Filed: Jun. 6, 2017

(65) Prior Publication Data
US 2017/0366038 A1 Dec. 21, 2017

Related U.S. Application Data

(60) Provisional application No. 62/350,829, filed on Jun. 16, 2016.

(51) Int. Cl.
H02J 7/35 (2006.01)
H01M 10/46 (2006.01)
H02J 7/00 (2006.01)

(52) U.S. Cl.
CPC ............ *H02J 7/35* (2013.01); *H01M 10/465* (2013.01); *H02J 7/0029* (2013.01); *H02J 7/0068* (2013.01); *H02J 7/0072* (2013.01)

(58) Field of Classification Search
CPC .......... H02J 7/35; H02J 7/0029; H02J 7/0068; H02J 7/0072; H01M 10/465; H01M 10/44
See application file for complete search history.

(56) References Cited

U.S. PATENT DOCUMENTS

| 8,222,765 | B2* | 7/2012 | Collins | H02J 3/28 307/44 |
| 8,493,020 | B2* | 7/2013 | Lee | H01M 10/465 307/66 |
| 8,937,822 | B2* | 1/2015 | Dent | H02M 7/53871 363/55 |
| 8,970,161 | B1* | 3/2015 | Cuadros | H02J 7/0068 320/101 |
| 8,975,859 | B2* | 3/2015 | Takehara | H01M 10/44 320/101 |
| 8,981,738 | B2* | 3/2015 | Tonicello | G05F 1/67 320/101 |
| 9,537,319 | B2* | 1/2017 | Parkhideh | H02J 3/38 |
| 9,543,775 | B2* | 1/2017 | Murayama | H02J 3/00 |
| 2006/0185727 | A1* | 8/2006 | Matan | H01L 31/02021 136/244 |
| 2007/0246943 | A1* | 10/2007 | Chang | H02J 3/28 290/44 |
| 2012/0047386 | A1* | 2/2012 | Matsui | H01M 10/465 713/340 |
| 2013/0334880 | A1* | 12/2013 | Jerphagnon | H02J 4/00 307/23 |

(Continued)

Primary Examiner — Michael C Zarroli

(57) ABSTRACT

A solar energy system utilizing a Multi-Function Power Converter System (MFPCS) with a solar energy extension control method can be operated as both solar energy converter system and high power battery charger/discharger system, such as an interleaved multi-phase DC/DC converter, or a three-phase grid-tied inverter plus direct battery charger, or a three-phase grid-tied inverter, or a three-phase solar/battery power discharger, or a three-phase PWM rectifier battery charger.

18 Claims, 12 Drawing Sheets

(56) References Cited

U.S. PATENT DOCUMENTS

2016/0141879 A1* 5/2016 Motsenbocker .......... G05F 1/67
  307/18
2019/0145592 A1* 5/2019 Lawson .................. F21S 9/035
  362/183

* cited by examiner

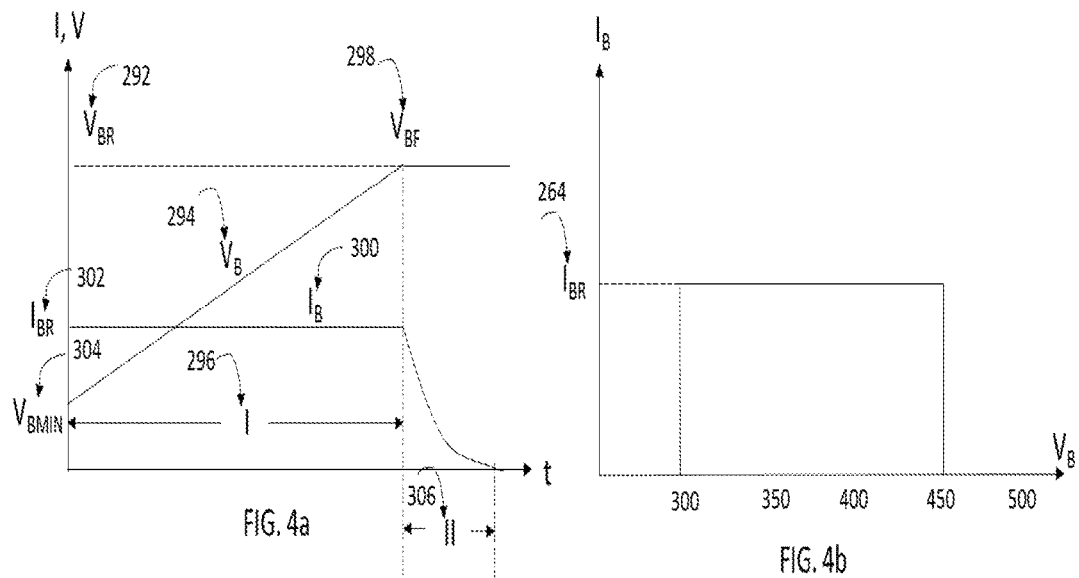
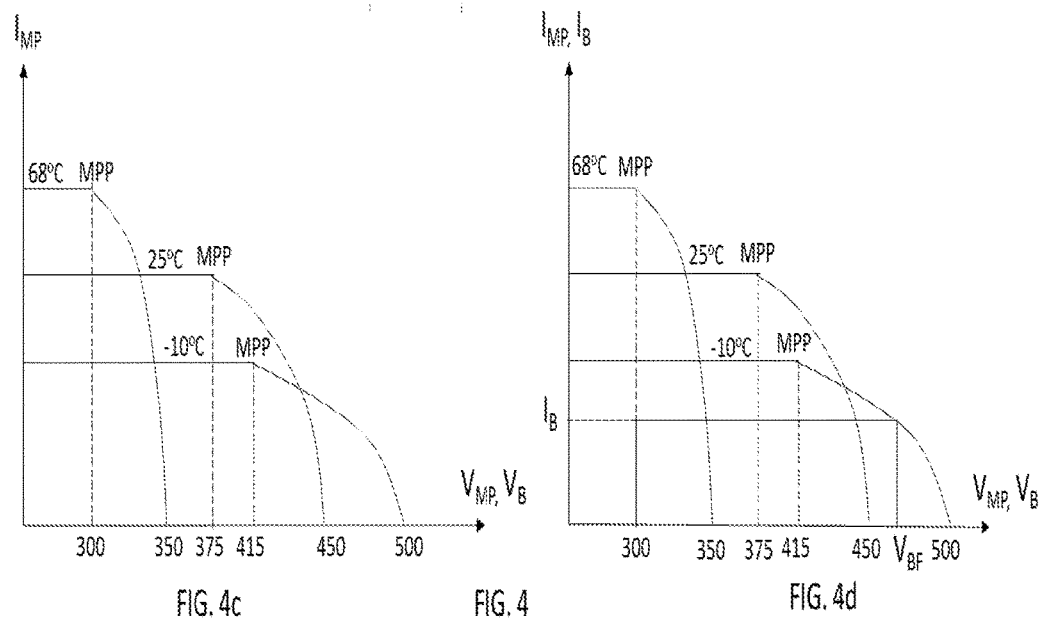
FIG. 4a  FIG. 4b  FIG. 4c  FIG. 4  FIG. 4d

| Description | MODE | Voltages | MODE Switches | | | |
|---|---|---|---|---|---|---|
| | | | SW1 | SW2 | SW3 | SW4 |
| Interleaved Multi Phase Super Charger | 1 | $V_{MP} < V_B$ | 0 | 1 | 1 | 0 |
| Solar Power Generation Plus Direct Battery Charger | 2 | $V_{MP} > V_B$ | 1 | 1 | 0 | 1 |
| Solar Power Generation | 3 | $V_B = 450V$ | 1 | 0 | 0 | 1 |
| Solar / Storage Battery Discharger | 4 | $300V \leq V_{MP} \leq 450V$ $P_S < P_L$ | 1 | 1 | 0 | 1 |
| PWM Rectifier Battery Charger | 5 | $V_{MP} = 0V$ | 0 | 1 | 0 | 1 |

SOLAR ENERGY SYSTEM WITH BUILT-IN BATTERY CHARGER AND ITS METHOD

CROSS-REFERENCE TO RELATED APPLICATIONS

This application claims the benefit of U.S. Provisional Application 62/350,829 and hereby incorporates the application by reference.

TECHNICAL FIELD

The present invention relates to solar energy systems utilizing battery super charger system, capable of maximizing solar energy usage by extending sun peak hour, such as but not limited to solar energy systems with built-in battery super charger and its method.

BACKGROUND

To mitigate the global warming problem, use of non-polluting, renewable and sustainable energy becomes necessary. Solar energy is one type of the desirable renewable energy.

The most popular application of solar energy is grid-tied solar system. It connects to the electric power grid. The two main components of such system are the solar modules and the solar power converter. A grid-tied solar power system has the main objective of extracting as much energy as possible from the solar modules when sunlight impinges on them while maintaining acceptable power quality, reliability and cost-competitiveness. However, achieving this objective is fraught with many challenges such as low conversion efficiency of the system, intermittency and variability nature of solar energy, Load variations and high cost of system. Adding an energy storage battery in such system mitigates some of these challenges, as it provides stored energy during nights, resulting in minimizing solar energy intermittency and variability effects and reducing customers' utility bills.

The techniques disclosed in U.S. Pat. Application US 2011/0210694 A1 and U.S. Pat. No. 5,522,944 represent the prior art of solar energy system with storage battery technology. These systems suffer three major deficiencies: (1) low battery charging efficiency because it requires two stages of power conversions (DC-AC and AC-DC); (2) long battery charging time because its battery charger is limited to low power charger due to cost; the typical battery recharging time is in several hours compared to in several minutes by a high power charger; thus, it cannot charge or discharge storage battery several times during the day to maximize the solar energy use; even if a separate high power battery charger is installed with a high cost, it still has very low battery charging efficiency as indicated in (1) above; (3) lack of optimal energy management control method for varying load power because it cannot quickly charge/discharge storage battery several times during the day. Therefore, a solar energy system with a high power single stage battery super charger system along with optimal energy management control method is best solution for the future solar energy system.

The prior art has not set forth a low cost and high efficiency solar energy system and method that can maximize solar energy usage and consume less grid power. The object of this invention is to provide a solar energy conversion system with a built-in high power storage battery super charger/discharger system and an optimal energy management control method to maximize solar energy usage by extend sun peak hour resulting in consuming less grid power.

SUMMARY

One non-limiting aspect of the present invention contemplates a solar energy converter with built-in high power storage battery charger/discharger a Multi-Function Power Conversion System (MFPCS), four (4) operation switches, LCL filters plus a transformer, multiple DC inductors, a solar power source, a storage battery power source, an AC grid power source and five (5) operation modes: an interleaved multi-phase super charger mode (Mode 1), a three-phase grid-tied inverter plus direct battery charging mode (Mode 2), a three-phase grid-tied inverter only mode (Mode 3), a three-phase solar/storage battery power discharger mode (Mode 4), and a three-phase PWM rectifier battery charger mode (Mode 5).

One non-limiting aspect of the present invention contemplates a MFPCS to provide DC/AC, AC/DC, DC/DC power conversion hardware functions comprising a three phase Insulated Gate Bipolar Transistor (IGBT) module mounted on a liquid cooled heatsink, connected to a DC-link capacitor, controlled by a IGBT drive circuit card, a DSP interface circuit card, and a DSP control Card, and interfaced with a DC current sensor and three AC current sensors.

One non-limiting aspect of the present invention contemplates a MFPCS providing power conversion and battery charging software control functions comprising a Mode 1 control library comprising interleaved multi-phase battery charging control algorithms, a Mode 2 control library comprising three-phase grid-tied inverter plus direct battery charging control algorithms, a Mode 3 control library comprising three-phase solar power grid-tied inverter control algorithms, a Mode 4 control library comprising three-phase solar/battery power grid-tied inverter control algorithms, and a Mode 5 control library comprising three-phase PWM rectifier battery charging control algorithms.

One non-limiting aspect of the present invention contemplates interleaved multi-phase battery charging control algorithms in Mode 1 control library charging storage battery power with solar power comprising an optimal solar power tracking unit, a battery voltage controller, a multi-phase DC current controller, and an interleaved multi-phase PWM modulator.

One non-limiting aspect of the present invention contemplates three-phase grid-tied inverter plus direct battery charging control algorithms in Mode 2 control library producing AC grid power plus directly charging storage battery with solar energy comprising a Maximum Power Point Tracking (MPPT) controller, a DC voltage controller, a required battery power calculation unit, a inverter power command generation means, a AC current reference generation means, a AC current controller, and a Space Vector Modulation (SVM) modulator.

One non-limiting aspect of the present invention contemplates three-phase solar power grid-tied inverter control algorithms in Mode 3 control library converting solar power to AC grid power comprising a MPPT controller, a DC voltage controller, a AC current reference generation unit, a AC current controller, and a SVM modulator.

One non-limiting aspect of the present invention contemplates three-phase solar power grid-tied inverter control algorithms in Mode 4 control library converting solar power and battery power to AC grid power comprising a MPPT controller, a DC voltage controller, a AC current reference generation unit, a AC current controller, and a SVM modulator.

One non-limiting aspect of the present invention contemplates three-phase PWM rectifier battery charger control library in Mode 5 control library converting AC grid power to storage battery power comprising a battery voltage controller, a battery current controller, a AC current reference generation unit, a AC current controller, and a SVM modulator.

One non-limiting aspect of the present invention contemplates an interleaved multi-phase battery charging control algorithms in Mode 1 control library comprising a structure of single layer current (Imp) control loop for Constant Current (CC) mode with the current reference Impr generated by optimal solar power tracking function, a two layers cascade control loop structure for Constant Voltage (CV) mode with a battery voltage loop as the outer loop and a current loop as the inner loop.

One non-limiting aspect of the present invention contemplates a three-phase solar power grid-tied inverter control algorithms in Mode 3 and Mode 4 control library and a three-phase grid-tied inverter plus direct battery charging control algorithms in Mode 2 control library comprising two layers cascade control loop structure with a DC voltage control loop as the outer loop and an AC current loop as the inner loop.

One non-limiting aspect of the present invention contemplates operation mode switches being operated based on an operation mode switch control table.

One non-limiting aspect of the present invention contemplates operation mode 1 comprising a hardware configuration of interleaved multi-phase super charger and software function of mode 1 control library.

One non-limiting aspect of the present invention contemplates operation mode 2 comprising a hardware configuration of three-phase grid-tied inverter plus direct battery charger and software function of mode 2 control library.

One non-limiting aspect of the present invention operation mode 3 comprising a hardware configuration of three phase grid-tied inverter and software function of mode 3 control library.

One non-limiting aspect of the present invention contemplates operation mode 4 comprising a hardware configuration of three phase solar/storage battery discharger and software function of mode 4 control library.

One non-limiting aspect of the present invention contemplates operation mode 5 comprising a hardware configuration of three phase PWM rectifier battery charger and software function of mode 5 control library.

One non-limiting aspect of the present invention contemplates a solar power extension method comprising a solar power extension software to maximize solar power usage and minimize grid power usage by charging/discharging storage batteries.

One non-limiting aspect of the present invention contemplates a solar power extension software comprising the steps of: calculating a output power $P_S$ of solar power source, a load power $P_L$, a State of Charge (SOC) of battery power source; sensing a output voltage $V_{MP}$ of solar power source, a terminal voltage $V_B$ of battery power source; determining on peak-hour/off peak-hour periods in accordance with time of the day; performing comparison logic operations of SOC, $P_S$ and $P_L$, $V_{MP}$ and $V_B$.

One non-limiting aspect of the present invention contemplates a solar power extension software comprising the steps of: setting Mode=1 when $V_{MP}$ is less than $V_B$, battery is within normal range and $P_S$ is greater than $P_L$, or when $V_{MP}$ is less than $V_B$ and battery is fully discharged; setting Mode=2 when $V_{MP}$ is greater than $V_B$ battery is within normal range and $P_S$ is greater than $P_L$, or when $V_{MP}$ is greater than $V_B$ and battery is fully discharged; setting Mode=3 when Ps is greater than $P_L$, battery is within normal range and during off peak-hour period, or when Ps is greater than $P_L$ and battery is fully charged; setting Mode=4 when in on peak-hour period, battery is within normal range and $P_S$ is greater than $P_L$, or when in off peak-hour period, battery is fully charged; setting Mode=5 when $P_S$=0, during off peak-hour period and battery needs charge.

One non-limiting aspect of the present invention contemplates a solar power conversion system with built-in high power storage battery charger/discharger and a solar power extension method to maximize solar power use and minimize grid power usage using a storage battery comprising a MFPCS operating in a selected one of at least five (5) operation modes: mode 1 as a interleaved multi-phase super charger, mode 2 as a three-phase grid-tied inverter plus direct battery charger, mode 3 as a three-phase grid-tied inverter, mode 4 as a three-phase solar/battery power discharger, and mode 5 as a three-phase PWM rectifier battery charger.

BRIEF DESCRIPTION OF THE DRAWINGS

The present invention is pointed out with particularity in the appended claims. However, other features of the present invention will become more apparent and present invention will be best understood by referring to the following detailed description in conjunction with the accompany drawings in which:

FIGS. 4a and 4b graphically illustrates the waveforms of battery current and voltage during the charging process in time domain and current-voltage (IV) domain respectively; FIG. 4c illustrates the IV curves of solar panel with Maximum Power Point (MPP) indicated under different operating temperatures; FIG. 4d illustrates the IV curves of solar panel and battery in battery charging process under different operating temperatures as contemplated by one non-limiting aspect of the present invention.

DETAILED DESCRIPTION

Unless otherwise defined, all technical and scientific terms used herein have the same meaning as commonly understood by one of ordinary skill in the art to which this invention belongs. For the following defined terms, these definitions shall be applied, unless a different definition is given in the claims or elsewhere in this specification "high power" is defined as three phase power that is greater than 50 kW. Storage battery is defined herein as meaning a battery in a solar energy system used to store the excess solar energy. "Solar Energy" is defined herein as meaning a group of solar panels that produce DC power.

Figure 1:
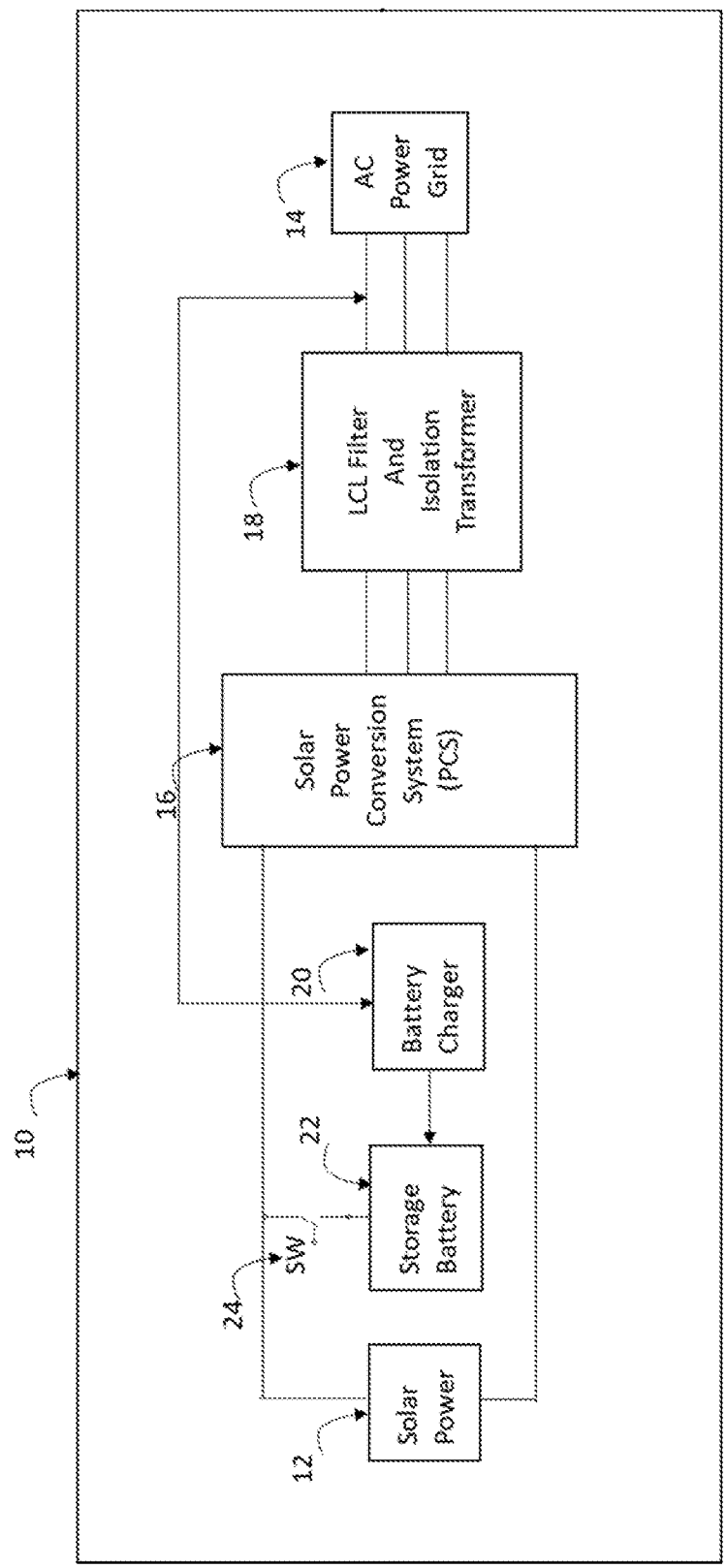
FIG. 1 illustrates the functional block diagram of prior art solar power system with storage battery and its low power charger.

FIG. 1 illustrates a functional block diagram of a prior art solar power system 10 incorporating storage batteries and its low power charger. In system 10, solar power source 12 is converted to AC grid power 14 by solar Power Conversion System (PCS) 16 and LCL filter plus isolation transformer 18. The storage battery 22 with the same nominal operating voltage of solar power source 12 is used to store the extra solar power during the sunny day and to be discharged by same solar PCS 16 when solar power 12 is not present. A separate low power battery charger 20 is used to charge the battery 22 by converting already inverted AC power back to DC. The battery charging is limiting to low power due to the high cost of high power battery charger. The switch 24 is only closed during the battery discharging period.

Figure 2:
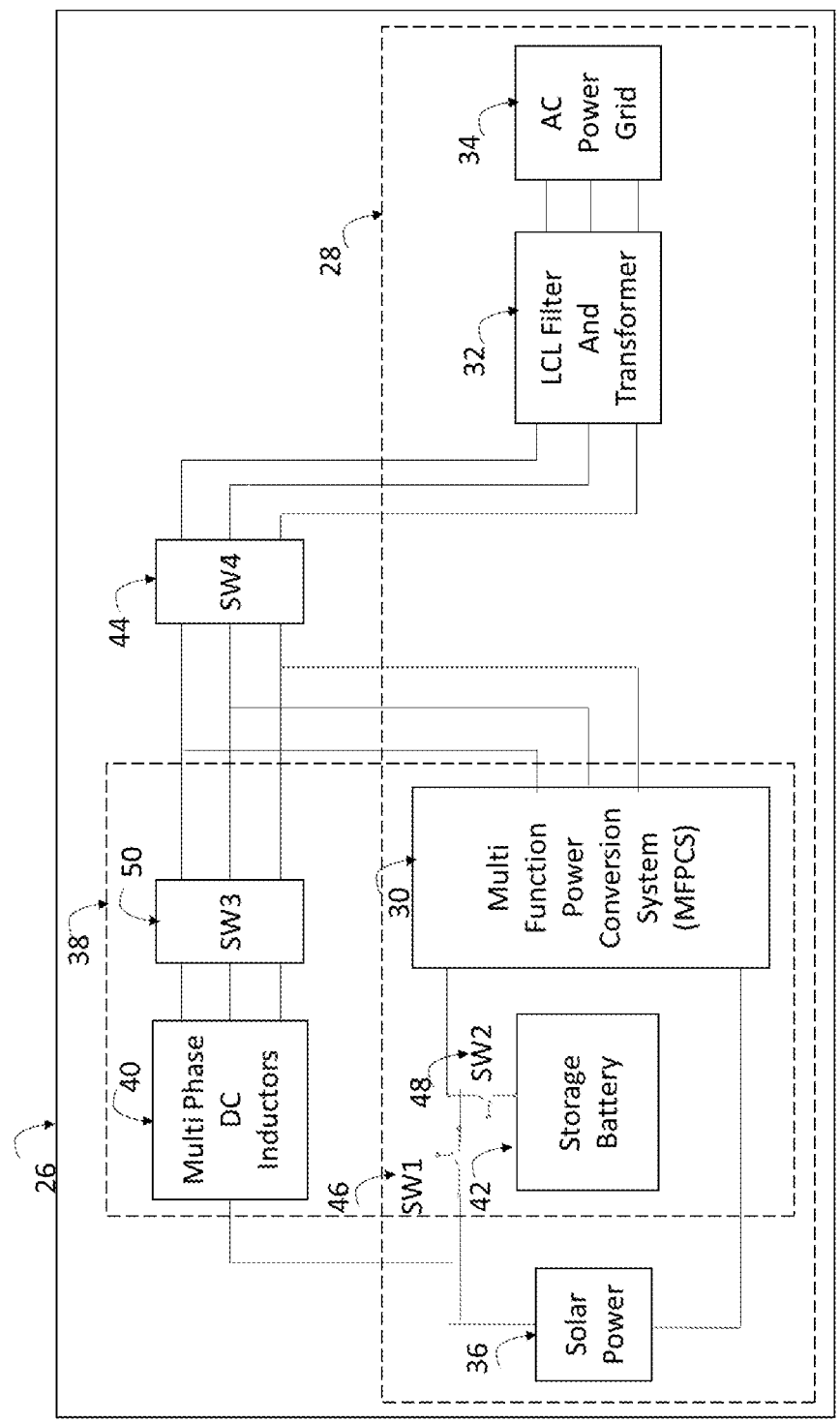
FIG. 2 illustrates the functional block diagram of a solar power system architecture incorporating built-in battery super charger as contemplated by one non-limiting aspect of the present invention.

In a solar power system with built-in super charger 26 as disclosed in this invention and illustrated in FIG. 2, a MFPCS 30 connecting to storage battery power source 42 and DC inductors 40 which further connecting to solar power source 36 through operation switches SW2 48, SW3 50 operates in Model (interleaved multi-phase super charger mode) to convert solar power to storage battery power when solar power voltage is less than battery voltage (Vmp<Vb); through operation switches SW1 46, SW2 48, and SW4 44, the MFPCS 30 connecting to solar power source 36, storage battery power source 42 and LCL filters plus transformer 32 which also connecting to AC grid power source 34 operates in Mode 2 (solar power generation plus direct battery charger mode) to convert solar power to AC grid power and directly charge battery when solar power voltage is greater than battery voltage (Vmp>Vb); through operation switches SW1 46 and SW4 44, the MFPCS 30 connecting to solar power source 36 and LCL filters plus transformer 32 which also connecting to AC grid power source 34 operates in Mode 3 (solar power generation mode) to convert solar power to AC grid power; through operation switches SW1 46, SW2 48, and SW4 44, MFPCS 30 connecting to solar power source 36, storage battery power source 42 and LCL filters plus transformer 32 which also connecting to AC grid power source 34 operates in Mode 4 (solar/storage battery power discharger mode) to convert both solar power and storage battery power to AC grid power; through operation switches SW2 48 and SW4 44, MFPCS 30 connecting to storage battery power source 42 and LCL filters plus transformer 32 which also connecting to AC grid power source 34 operates in Mode 5 (PWM rectifier battery charger mode) to charge storage battery power with AC grid power. Sub-section 38 illustrates the DC/DC power conversion system configuration in Mode 1. Sub-section 28 illustrates the DC/AC or AC/DC power conversion configurations in Modes 2, 3, 4, 5.

Figure 3:
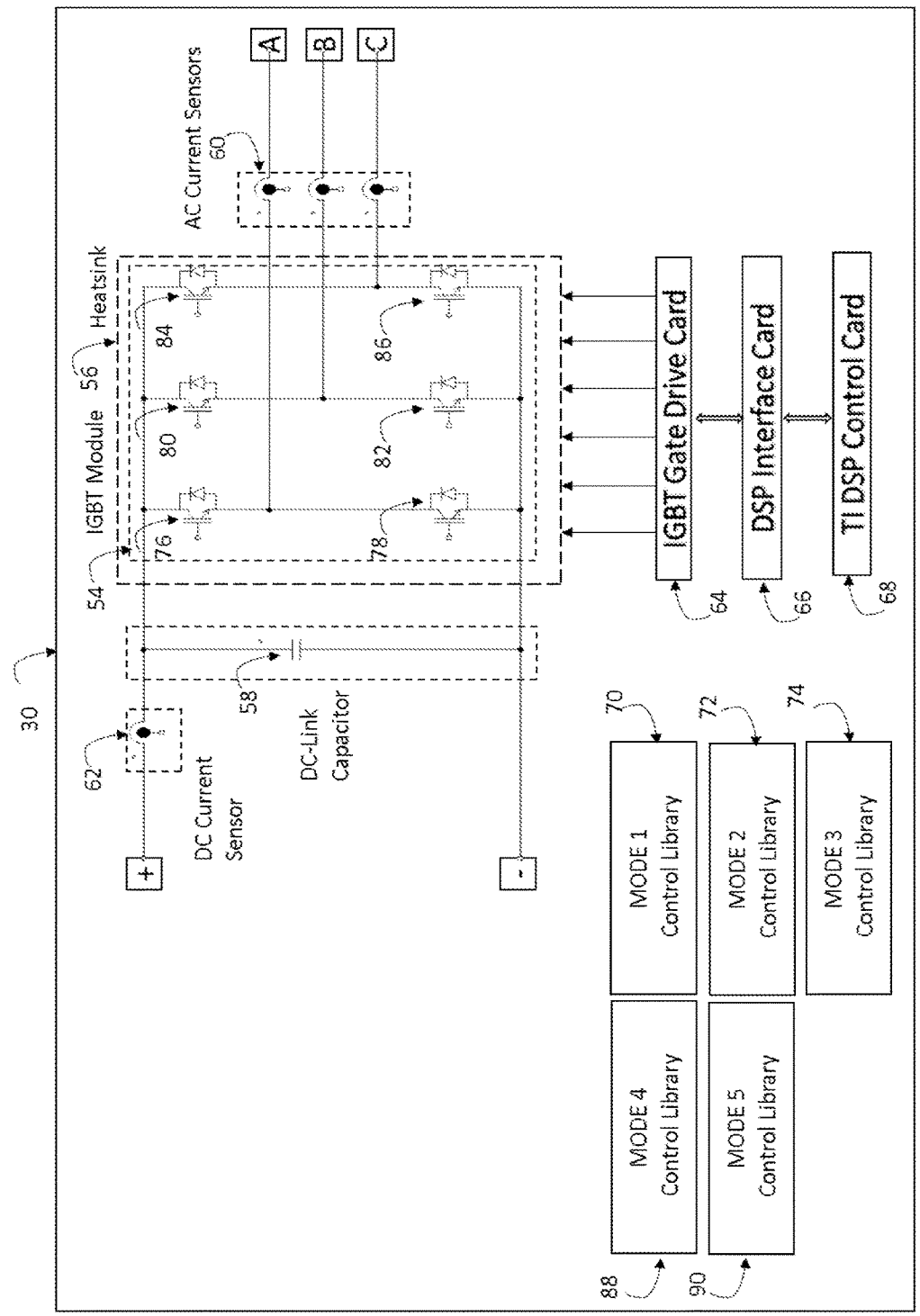
FIG. 3 illustrates a diagram of MFPCS as contemplated by one non-limiting aspect of the present invention.

FIG. 3 schematically illustrates a MFPCS 30 having an IGBT module 54 mounted on a liquid cooled heatsink 56 and connected to DC-link capacitor 58 as contemplated by one non-limiting aspect of the present invention. The MFPCS 30 is shown for exemplary and non-limiting purpose being as a power electronic converter utilized in a solar power system with built-in super charger 26 (in FIG. 2) for performing DC/AC, AC/DC, and DC/DC power conversion functions.

In FIG. 3 AC current sensing system 60 and a DC current sensing system 62 may be included which provide sensed currents of LCL filter plus isolation transformer 32 in solar power generation/battery discharger system 28 (in FIG. 2), or of DC inductors 40 in interleaved multi-phase battery charger system 38 (in FIG. 2), and of DC-link capacitor 58, so as to control of DC/AC, AC/DC, DC/DC power conversions. The DSP interface card 66 may condition and filter feedback signals from current sensors 60, 62 and other sensing devices within the system, and provide them to DSP control card 68 for further processes. The DSP control card 68 being loaded with Mode 1 control library 70, Mode 2 control library 72, Mode 3 control library 74, Mode 4 control library 88, and Mode 5 control library 90 may cooperate with DSP interface card 66 and IGBT gate drive card 64 to control IGBT module 54 such as the opening and closing of switches 76, 78, 80, 82, 84, 86 to produce the desired voltage/current waveform patterns for DC/AC, AC/DC and DC/DC power conversions.

FIG. 4a illustrates time domain waveforms of battery current $I_B$ 300 and battery voltage $V_B$ 294 during the charging period. In constant current mode period I 296, the battery charging current $I_B$ 300 is regulated to its reference value $I_{BR}$ 302 and the voltage $V_B$ 294 increases from starting voltage $V_{BMIN}$ 304 to its float voltage $V_{BF}$ 298. Then the charging process switches to a constant voltage mode period II 306 where the voltage $V_B$ 294 is regulated to its reference value $V_{BR}$ 292, meanwhile the current $I_B$ 300 starts to fall until reaching zero to complete the charging process. FIG. 4b illustrates an example of battery charging curve in IV (current vs voltage) plane. In this graph, when $V_B$=300 v, the charger starts to charge battery with a constant current $I_{BR}$ 264 until the battery voltage $V_B$=450 v. Then $V_B$ is regulated at 450 v until battery current $I_B$ falls to zero.

FIG. 4c illustrates an example IV curve of solar panels under different operating temperatures. When temperature is 25° C., the Maximum Power Point (MPP) occurs at $V_{MP}$=375 v; When temperature is −10° C., the MPP occurs at $V_{MP}$=415 v; When temperature is 68° C., the MPP occurs at $V_{MP}$=300 v.

FIG. 4d maps the IV curves of battery charging process into solar power IV plane. When solar power MPP voltage $V_{MP}$ is less than battery voltage $V_B$ ($V_{MP}<V_B$), an interleaved multi-phase super charger topology (Mode 1) is used to charge battery from solar power with maximum charging current over entire battery voltage range (300 v-450 v). When solar power MPP voltage $V_{MP}$ is greater than battery voltage $V_B$ ($V_{MP}>V_B$), a three phase grid-tied inverter plus direct battery charger is used to directly charge battery with part of solar power and convert the rest of solar power to AC grid power (Mode 2).

Figure 5:
FIG. 5 illustrates an operation mode switch control table as contemplated by one non-limiting aspect of the present invention.

FIG. 5 illustrates operation mode switch control table 92 used by MFPCS 30 to select operation mode of solar power system with built-in super charger based on the IV curves of solar power generation and battery charging processes. When $V_{MP}<V_B$, an interleaved multi-phase super charger mode (Mode 1) is selected with SW1=0, SW2=1, SW3=1, SW4=0. When $V_{MP}>V_B$, an solar power generation plus direct battery charger mode (Mode 2) is selected with SW1=1, SW2=1, Sw3=0, Sw4=1. When battery voltage $V_B$=450 v (float voltage) indicating the battery is fully charged, a solar power generation mode (Mode 3) is selected with SW1=1, SW2=0, Sw3=0, Sw4=1. When battery voltage is between 300V and 450V and solar power is less than load power, a solar/battery power discharger mode (Mode 4) is selected with SW1=1, SW2=1, SW3=0 SW4=1. When $V_{MP}$=0V indicating the solar power is not present, a PWM rectifier battery charger mode (Mode 5) is selected with SW1=0, SW2=1, SW3=0 SW4=1.

Figure 6:
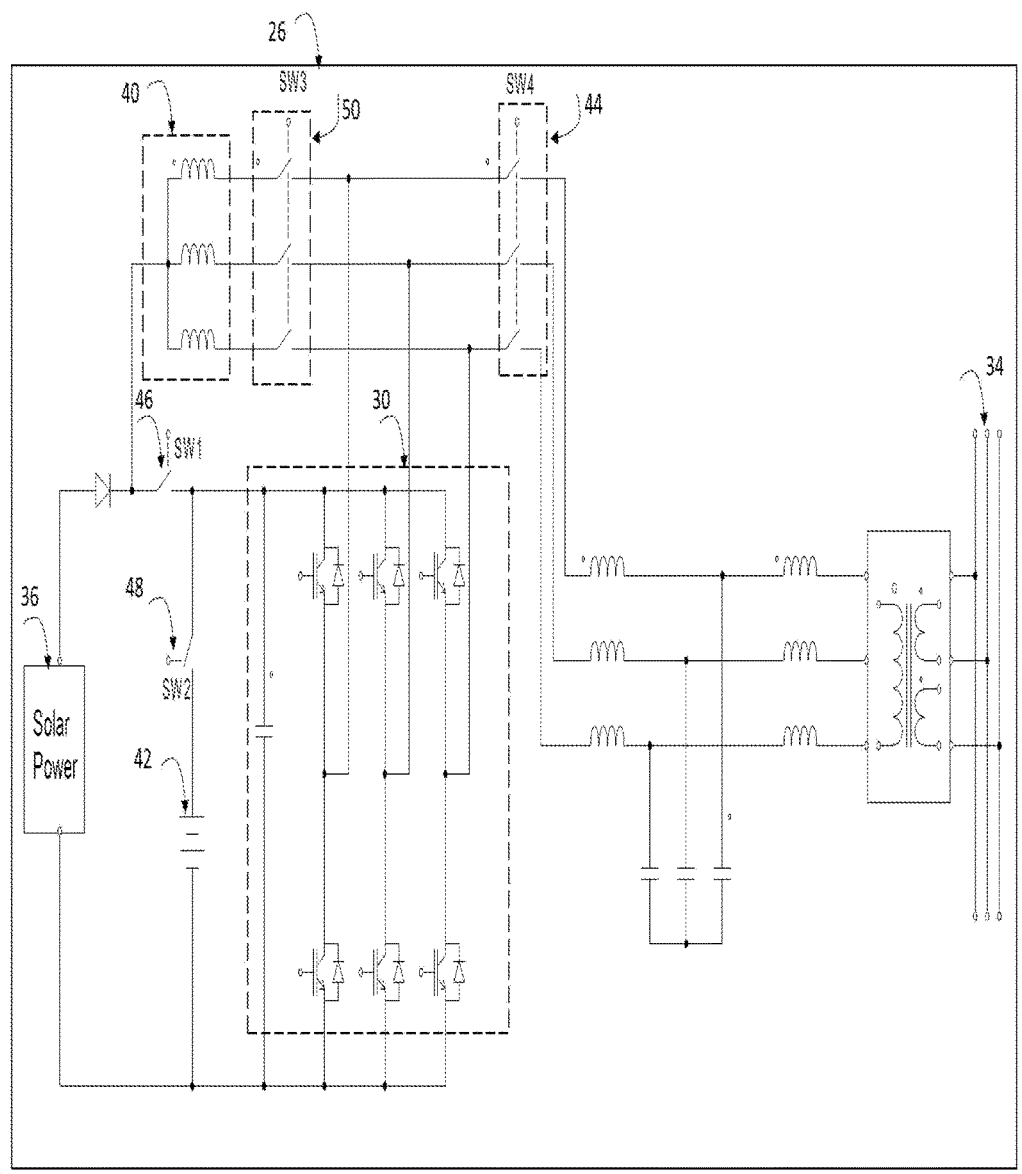
FIG. 6 illustrates an example diagram of a solar power system with built-in super charger configured in a selected one of at least five (5) operation modes as contemplated by one non-limiting aspect of the present invention.

FIG. 6 illustrates the detailed electrical schematic diagram of a solar power system with built-in super charger 26, that may be configured with multiple operation modes providing solar power generation and storage battery charging/discharging functions. In Mode 1 where $V_{MP}<V_B$, MFPCS 30 is operated as an interleaved multi-phase super charger with DC inductors 40 and operation switches set as SW1(46)=0, SW2(48)=1, SW3(50)=1, SW4(44)=0, to charge the storage battery 42 with solar power source 36. The solar power source 36 provides the maximum charging current over entire battery voltage range (300 v-450 v) in this mode. In mode 2 where $V_{MP}>V_B$, MFPCS 30 is operated as a three-phase grid-tied inverter plus direct battery charger connecting to both solar power 36 and storage battery 42 with operation switches set as SW1(46)=1, SW2(48)=1, SW3(50)=0, SW4(44)=1, to extract maximum solar power with MPPT and directly charge battery 42 with part of solar power 36 and also convert the rest of solar power to AC grid power 34. In Mode 3 where $V_B=V_{BR}$ (450 v) and battery charging process is ended, MFPCS 30 is operated as a three-phase grid-tied inverter connecting only to solar power 36 with operation switches set as SW1(46)=1, SW2(48)=0, SW3(50)=0, SW4(44)=1, to convert all solar power 36 to AC grid power 34. In Mode 4 where battery voltage is between 300V and 450V and solar power is less than load power, MFPCS 30 is operated as a three-phase solar/storage battery power discharger connecting to solar power 36 and battery 42 with operation switches set as SW1(46)=1, SW2 (48)=1, SW3(50)=0 SW4(44)=1, to convert solar power 36 and battery power 42 to AC grid power 34. In Mode 5 when $V_{MP}$=0V indicating the solar power is not present, MFPCS 30 is operated as a three-phase PWM rectifier battery charger connecting to battery 42 with operation switches set as SW1(46)=0, SW2(48)=1, SW3(50)=0 SW4(44)=1, to convert AC grid power 34 to battery power 42.

Figure 7:
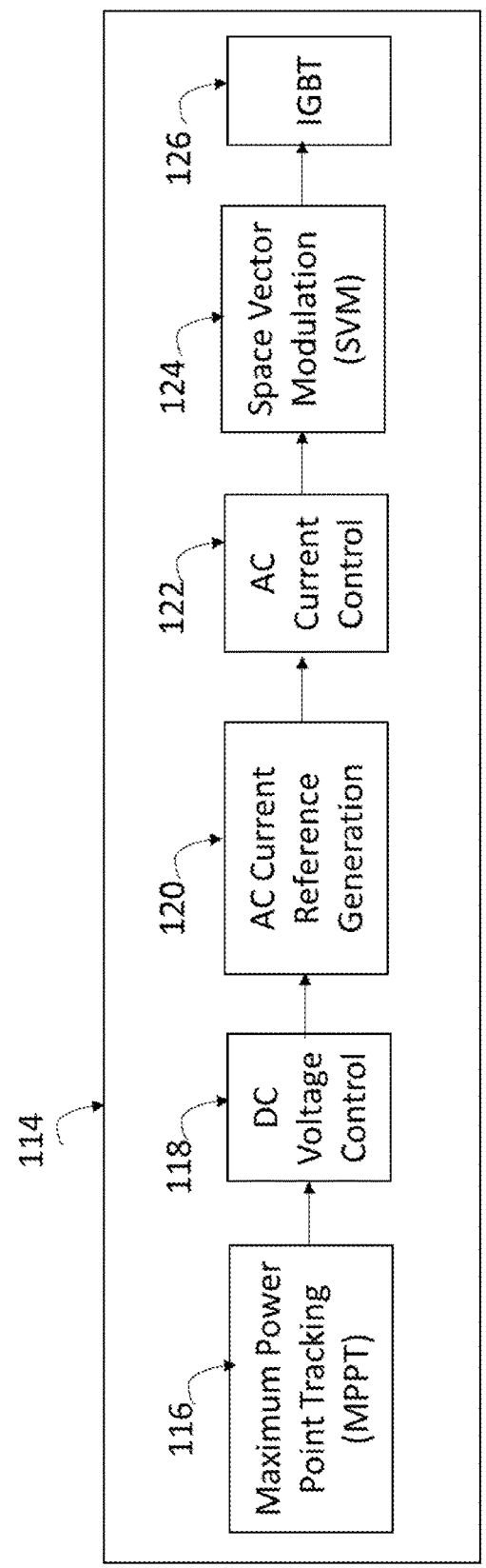
FIG. 7 illustrates the functional block diagram of three phase solar power grid-tied inverter control algorithms as contemplated by one non-limiting aspect of the present invention.

FIG. 7 illustrates the functional block diagram of three-phase grid-tied inverter control algorithms 114 in Mode 3 and Mode 4 control libraries. In this control algorithm, the MPPT 116 extracts the maximum solar power by producing a dynamic voltage reference to DC voltage control 118. The DC voltage control 118 regulates the DC voltage by generating a power command for AC current reference generation 120. The reference generation 120 produces the current reference for AC current control 122 which regulates AC current by commanding Space Vector Modulation (SVM) 124 to generate PWM signals controlling IGBT 126 to convert solar power to AC grid power in Mode 3 and Mode 4.

Figure 8:
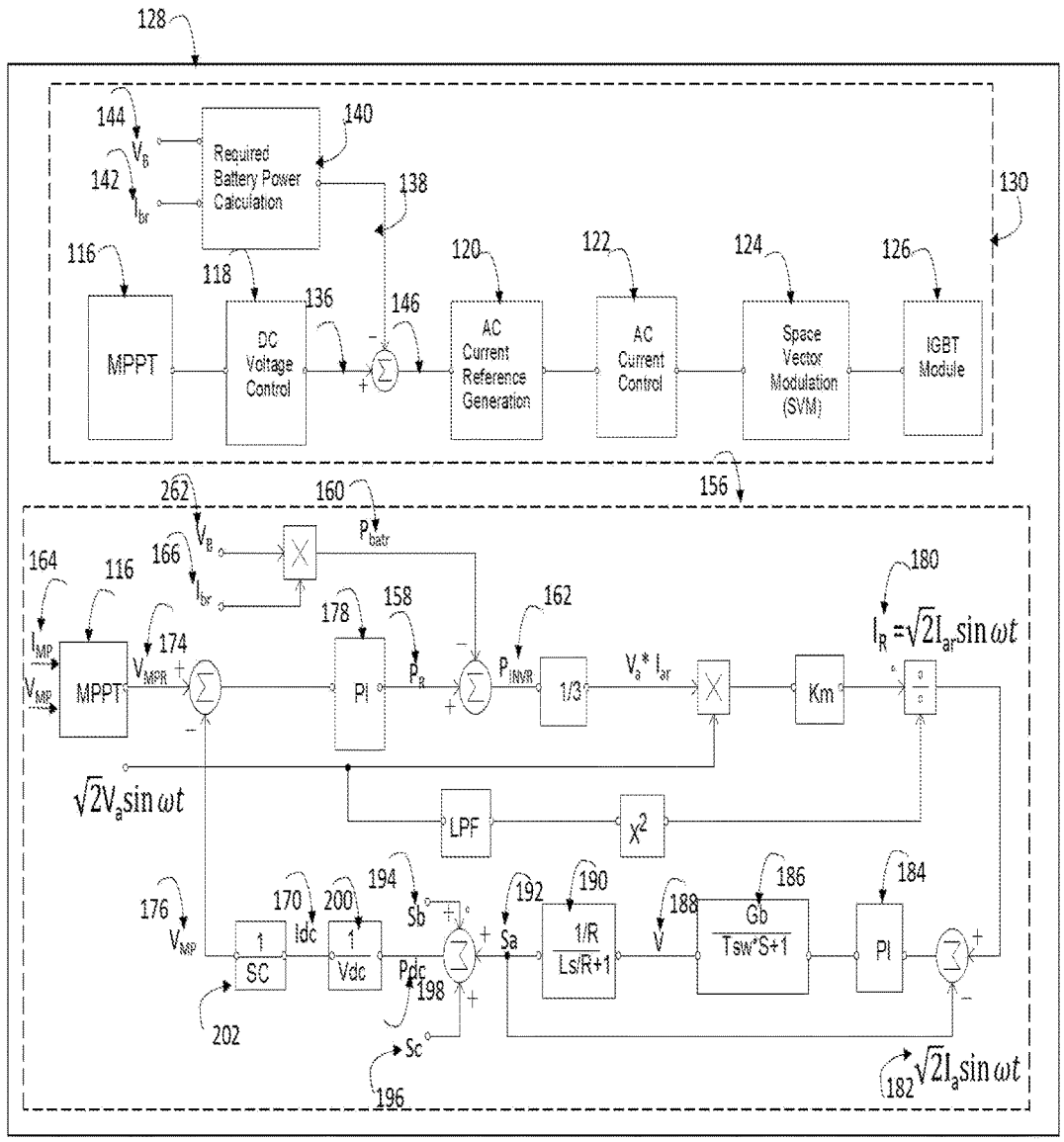
FIG. 8 illustrates the functional block diagram and detailed control diagram of three-phase grid-tied inverter plus direct battery charging control algorithms as contemplated by one non-limiting aspect of the present invention.

FIG. 8 illustrates the functional block diagram 130 and detailed control loop diagram 156 of three-phase grid-tied inverter plus direct battery charging control algorithms 128 in Mode 2 control library. In functional diagram 130, MPPT 116 extracts the maximum solar power by producing a dynamic voltage reference to DC voltage control 118. The DC voltage control 118 regulates the DC voltage by generating a solar power command 136. Required battery power calculation 140 produces required battery charging power 138 based on battery charging current reference Ibr 142 and battery voltage Vb 144. An inverter command generation unit produces inverter power command 146 by subtracting required battery charging power 138 from solar power command 136. The inverter power command 146 is fed to AC current reference generation 120 to produce current reference for AC current control 122 which regulates AC currents by commanding SVM 124 to generate PWM signals controlling IGBT 126 to directly charge the battery with part of solar power and to convert rest of solar power to AC grid power in Mode 2.

The detailed control loop diagram 156 illustrates two layers control loop used in control algorithms 128. This cascade control structure is based on the balance of solar power command $P_R$ 158, battery charging power command $P_{batr}$ 160, inverter power command $P_{INVR}$ 162 ($P_{INVR}=P_R-P_{batr}$) and relationships of solar voltage $V_{MP}$ 176, solar current $I_{MP}$ 164, battery charging current $I_{br}$ 166, inverter current $\sqrt{2}$ Ia sin(wt) 182, and DC current Idc 170 where $I_{MP}$=Ibr+Idc, $$I_{MP} = Ibr + Idc, Idc = \frac{3Va*Ia}{Vdc}, Vmp = C \times \left(\frac{dIdc}{dt}\right),$$

In control loop diagram 156, MPPT means 116 determines solar voltage reference $V_{MPR}$ 174. $V_{MPR}$ 174 is subtracted from measured DC voltage $V_{MP}$ 176, the error is fed into DC voltage control 178 which produces solar power command $P_R$ 158. Under constant current mode, the battery charging current is controlled by its reference Ibr 166 while the battery voltage $V_B$ 262 increases, resulting in an increased battery charging power command $P_{batr}$ (160)=Ibr×$V_B$. The solar power command $P_R$ 158 is subtracted from $P_{batr}$ 160 to obtain inverter power command $P_{INVR}$ 162. $P_{INVR}$ is fed to an AC current reference generation circuit to create an AC current command $I_R=\sqrt{2}$Iar sin($\omega$t) 180. Then it is compared with measured current $\sqrt{2}$ Ia sin($\omega$t) 182. The error is fed to current control 184 which generate a PWM command. The PWM command is amplified by PWM inverter 186 as an input voltage 188 (V) of LCL filter 190 to generate one phase inverter output power Sa 192. The sum of three phase output power of inverter Sa 192, Sb 194, Sc 196 is equal to DC power Pdc 198 at inverter DC-link. The DC power Pdc 198 is divided by measured DC voltage Vdc 200 to obtain DC current Idc 170 which is changed to DC voltage $V_{MP}$ 176 with the integrator block 202.

Figure 9:
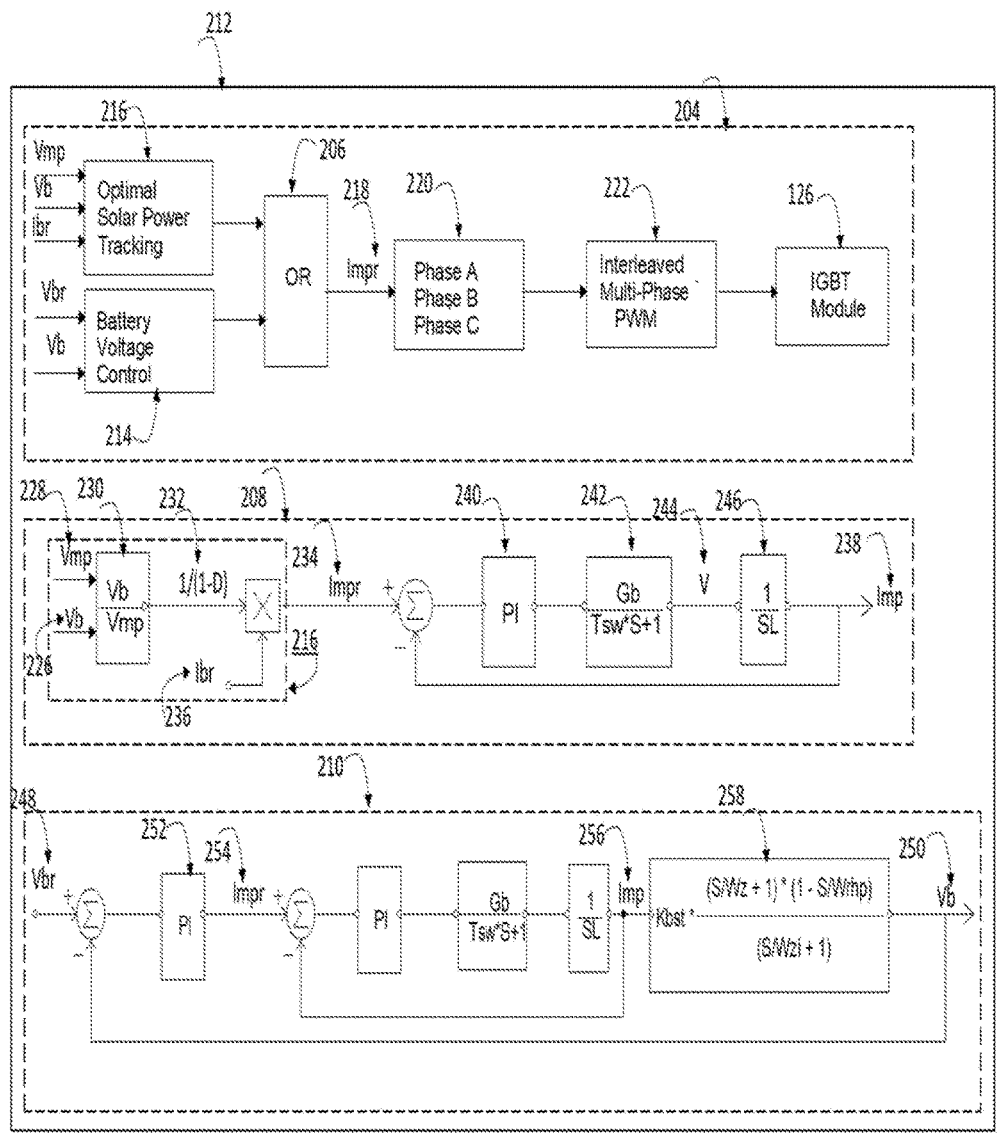
FIG. 9 illustrates the functional block diagram and detailed control loop diagram of interleaved multi-phase battery charging control algorithms as contemplated by one non-limiting aspect of the present invention.

FIG. 9 illustrates the functional block diagrams 204 and control loop diagrams 208, 210 of interleaved multi-phase battery charging control algorithms 212 in Mode 1 control library. In functional block diagram 204 while battery voltage is regulated by battery voltage control 214, battery current is regulated by optimal solar power tracking 216. Fed by Impr 218 that is the output of either voltage control 214 or optimal solar power tracking 216, a multi-phase current control 220 regulates DC current of each DC inductor by commanding interleaved multi-phase PWM 222 to generate PWM signals controlling IGBT 126 to charge storage battery in Mode 1.

The Optimal Solar Power Tracking unit 216 in single layer constant current control loop diagram 208 generates a current reference Impr 234 (the battery voltage Vb 226 and solar voltage Vmp 228 are used by function block 230 to derive the inverse duty cycle $$\frac{1}{1-D}(232) = \frac{Vb(226)}{Vmp(228)}.$$

and the solar current reference Impr 234 is related to battery charging current reference Ibr 236 with $$Impr = \frac{1}{1-D} \times Ibr.$$

The current reference Impr 234 is compared with the measured current Imp 238 and the error is fed into current control means 240 which generates a PWM command. This command is amplified by interleaved multi-phase DC/DC converter 242 as input voltage 244 (V) of plant block 246 to force solar current Imp 238 to follow its reference Impr 234.

In two layer constant voltage control loop diagram 210, battery voltage reference Vbr 248 is compared with measured battery voltage Vb 250 and the error is fed into battery voltage control 252 which produces a solar current reference Impr 254. The solar current Imp 256 is controlled to follow the current reference Impr 254 with the current loop. The current Imp 256 is transformed to battery voltage Vb 250 by the Interleaved Multi-Phase Power Converter transfer function 258 and the battery voltage Vb 250 is regulated to match its reference Vbr 248.

Figure 10:
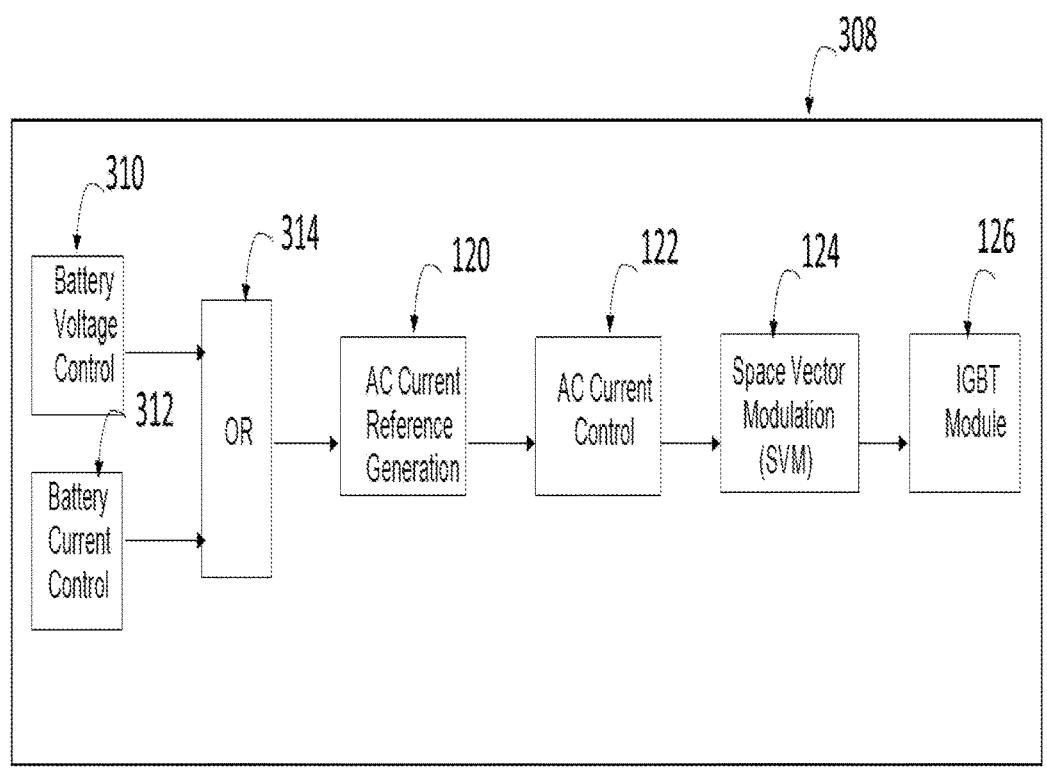
FIG. 10 illustrates the functional block diagram of three-phase PWM rectifier battery charging control algorithms as contemplated by one non-limiting aspect of the present invention.

FIG. 10 illustrates three-phase PWM rectifier battery charging control algorithms 308 in Mode 5 control library. In this control algorithm, while battery voltage is regulated by battery voltage control 310 in constant voltage mode, the battery current is regulated by battery current control 312 in constant current mode. Using the output of OR block 314 that is the output of either voltage control 310 or current control 312, AC current reference generation 120 produces AC current reference for AC current control 122. AC current control 122 regulates AC current by commanding SVM 124 to generate PWM signals controlling IGBT 126 to charge battery with AC grid power in Mode 5.

Figure 11:
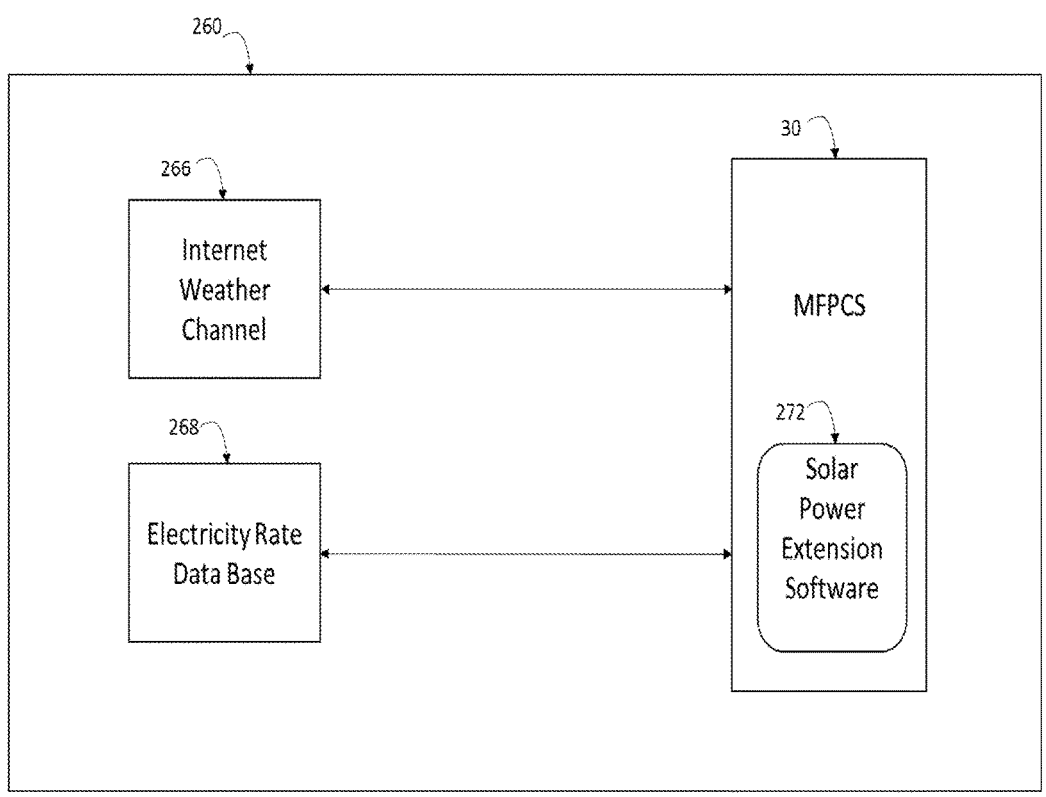
FIG. 11 illustrates the solar power extension software environment as contemplated by one non-limiting aspect of the present invention.

FIG. 11 illustrates solar power extension software environment 260 used in solar power system with built-in super charger. In software environment 260, solar power extension software 272 inside MFPCS 30 determines when and how to charge or discharge the storage batteries based on data from MFPCS, the weather condition information from internet weather channel 266, and peak hour electricity rate from the data base 268.

Figure 12:
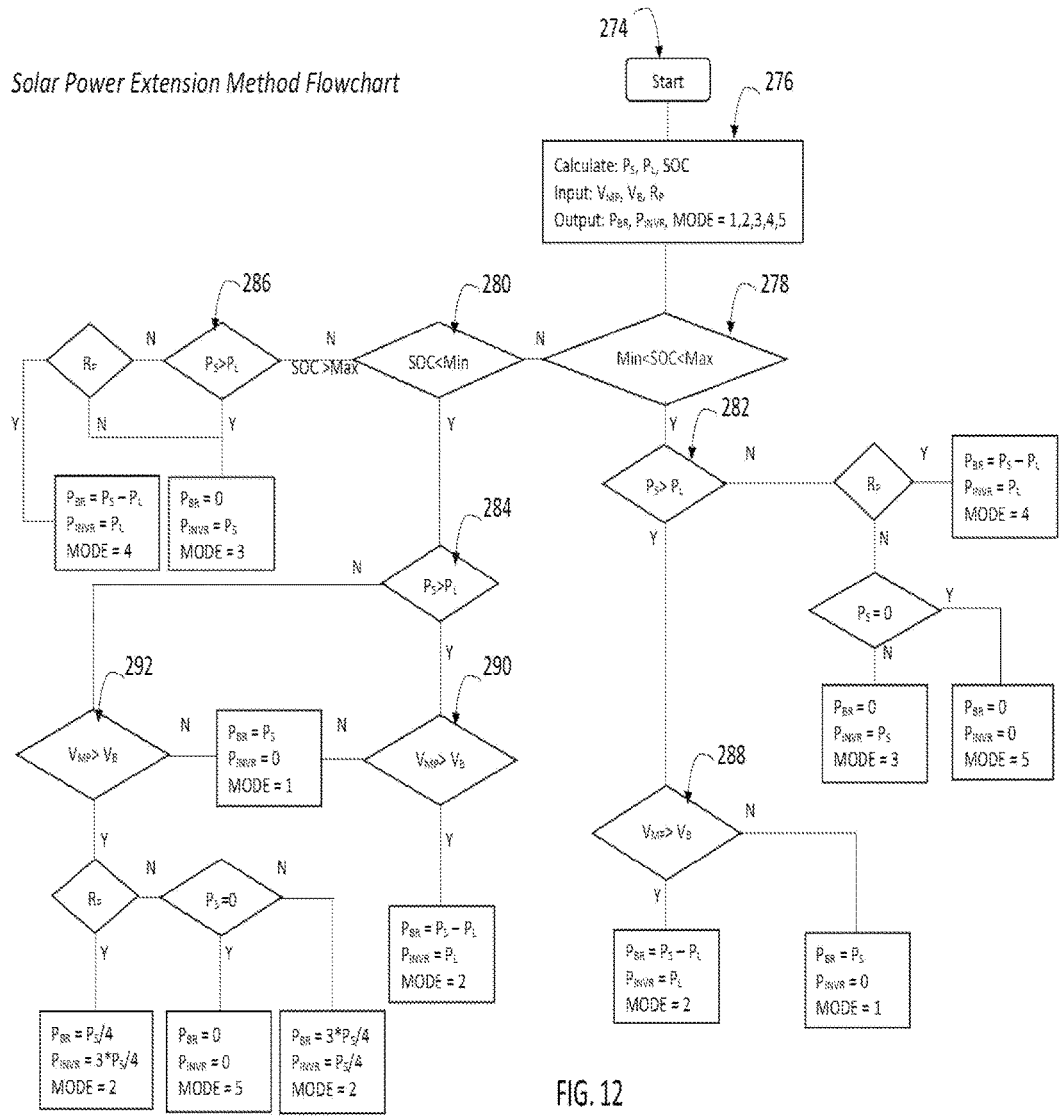
FIG. 12 illustrates solar power extension method flowchart as contemplated by one non-limiting aspect of the present invention.

Referring to the flow chart of FIG. 12 for a more detailed description of solar power extension software 272, upon start 274, function 276 calculates the solar power $P_S$, load power $P_L$, and battery SOC; senses the solar power output voltage $V_{MP}$, battery voltage $V_B$; and determines on peak-hour/off peak-hour periods $R_P$ in accordance with time of the day. Functions 278, 280 examine if battery is within normal range (Min<SOC<Max), fully discharged (SOC<Min), or fully charged (SOC>=Max). Functions 282, 284, 286 check if solar power $P_S$ is greater than load power $P_L$. Functions 288, 290, 292 determine if solar power voltage $V_{MP}$ is greater than battery voltage $V_B$. If battery SOC is within normal range, mode is set to 1 (MODE=1) when solar power $P_S$ is greater than load power $P_L$ and solar power voltage $V_{MP}$ is less than battery voltage $V_B$; mode is set to 2 (MODE=2) when solar power $P_S$ is greater than load power $P_L$ and solar power voltage $V_{MP}$ is greater than battery voltage $V_B$; mode is set to 3 (MODE=3) when solar power $P_S$ is less than load power $P_L$, during off peak-hour period, and solar power $P_S$ is greater than zero; mode is set to 4 (MODE=4) when solar power $P_S$ is less than load power $P_L$ and during on peak-hour period; mode is set to 5 (MODE=5) when solar power $P_S$ is less than load power $P_L$, during off peak-hour period, and solar power $P_S$ is equal to zero. If battery is fully discharged (SOC<Min), mode is set to 1 (MODE=1) when solar power $P_S$ is greater than load power $P_L$, and solar voltage $V_{MP}$ is less than storage battery voltage $V_B$; mode is also set to 1 (MODE=1) when solar power Ps is less than load power $P_L$ and solar voltage $V_{MP}$ is less than battery voltage $V_B$; mode is set to 2 (MODE=2) when solar power $P_S$ is greater than load power PL and solar voltage $V_{MP}$ is greater than said battery voltage $V_B$. If battery is fully charged (SOC>=Max), mode is set to 3 (MODE=3) when solar power $P_S$ is greater than load power $P_L$ or solar power Ps is less load power $P_L$ during off peak-hour period; mode is set to 4 (MODE=4) when solar power Ps is less than load power $P_L$ during on peak-hour period. If battery is fully discharged (SOC<Min), mode is set to 2 (MODE=2), battery charging power reference $P_{BR}=P_S/4$, and inverter power reference $P_{INVR}=P_S \times 3/4$ when solar power Ps is less than load power $P_L$, solar voltage $V_{MP}$ is greater than battery voltage $V_B$, and during on peak-hour period; mode is also set to 2 (MODE=2), but battery charging power reference $P_{BR}=P_S \times 3/4$, inverter power reference $P_{INVR}=P_S/4$ when solar power $P_S$ is less than load power $P_L$, solar voltage $V_{MP}$ is greater than battery voltage $V_B$, and during off peak-hour period; mode is set to 5 (MODE=5) when solar power $P_S$ is less than load power $P_L$, solar voltage $V_{MP}$ is greater than battery voltage $V_B$, during off peak-hour period, and solar power $P_S$ is equal to zero.

While exemplary embodiments are described above, it is not intended that these embodiments describe all possible forms of the invention, rather, the words used in the specification are words of description rather than limitation, and it is understood that various changes may be made without depart from the spirit and scope of the invention. Additionally, the features of various implementing embodiments may be combined to form further embodiments of the invention.

What is claimed is:

1. A solar energy converter with built-in high power battery charger/discharger system comprising:
   a Multi-Function Power Conversion System (MFPCS) comprising Solar Power Extension Software;
   a plurality of operation switches;
   a LCL filters plus a transformer;
   a plurality of DC inductors;
   a solar power source;
   a storage battery power source;
   an AC grid power source; and
   a plurality of operation modes: an interleaved multi-phase super charger mode (mode 1), a solar power generation plus direct battery charging mode (mode 2), a solar power generation mode (mode 3), a solar/storage battery power discharger mode (mode 4), and a three-phase pulse width modulation (PWM) rectifier battery charger mode (mode 5),
wherein, through the operation switches the MFPCS is connected to the storage battery, the solar power source, the DC inductors, the LCL filters plus a transformer, and configured to operate in a selected one of at least five (5) operation modes.

2. The solar energy converter with built-in high-power battery charger/discharger system of claim 1, wherein said MFPCS providing power conversion and battery charging/discharging hardware structures further comprises:
 a three-phase three phase Insulated Gate Bipolar Transistor (IGBT) module;
 a liquid cooled heatsink;
 a DC-link capacitor;
 a IGBT gate drive circuit card;
 a DSP interface circuit card;
 a DSP control card, and
 wherein the IGBT module is mounted on the liquid cooled heatsink, connected to a DC-link capacitor and controlled by three electronic circuit cards: the IGBT gate drive circuit card, the Digital Signal Processor (DSP) interface circuit card, the DSP control Card.

3. The solar energy converter with built-in high-power battery charger/discharger system of claim 1, wherein said MFPCS providing power conversion and battery charging/discharging software functions further comprises:
 a Mode 1 control library comprising interleaved multi-phase battery charging control algorithms;
 a Mode 2 control library comprising three-phase grid-tied inverter plus direct battery charging control algorithms
 a Mode 3 control library comprising three-phase solar power grid-tied inverter control algorithms,
 a Mode 4 control library comprising three-phase solar/battery power grid-tied inverter control algorithms, and
 a Mode 5 control library comprising three-phase PWM rectifier battery charger control algorithms.

4. The solar energy converter with built-in high-power battery charger/discharger system of claim 3, wherein said interleaved multi-phase battery charging control algorithms in Mode 1 control library charging storage battery with solar energy further comprises:
 an optimal solar power tracking unit extracting the maximum solar power by generating a current reference in constant current mode;
 a battery voltage controller regulating battery voltage by generating a current reference in constant voltage mode;
 a multi-phase DC current controller regulating DC current with the current reference of either the battery voltage controller or the optimal solar power tracking unit by generating a PWM command voltage; and
 an interleaved multi-phase PWM modulator generating PWM signals based on the PWM command voltage.

5. The solar energy converter with built-in high-power battery charger/discharger system of claim 3, wherein said three-phase grid-tied inverter plus direct battery charging control algorithms in Mode 2 control library producing AC grid power plus directly charging storage battery with solar energy further comprises:
 a Maximum Power Point Tracking (MPPT) controller extracting the maximum solar power by producing a dynamic voltage reference;
 a DC voltage controller regulating solar power output voltage with the dynamic voltage reference by generating a solar power command;
 a required battery power calculation unit calculating a required battery charging power command;
 an inverter power command generation unit producing an inverter power command with the solar power command and the required battery charging power command;
 an AC current reference generation unit producing an AC current reference with the inverter power command;
 an AC current controller regulating AC current with the AC current reference by generating a PWM command voltage; and
 a Space Vector Modulation (SVM) generating PWM signals based on the PWM command voltage.

6. The solar energy converter with built-in high-power battery charger/discharger system of claim 3, wherein said three-phase solar power grid-tied inverter control algorithms in Mode 3 and Mode 4 control libraries converting solar power and solar/battery power to AC grid power further comprises:
 a MPPT controller extracting the maximum solar power by producing a dynamic voltage reference;
 a DC voltage controller regulating solar power output voltage with the dynamic voltage reference by generating an inverter power command;
 a AC current reference generation unit producing an AC current reference with the inverter power command;
 a AC current controller regulating AC current with the AC current reference by generating a command voltage, and
 a SVM modulator generating PWM signals based on the command voltage.

7. The solar energy converter with built-in high-power battery charger/discharger system of claim 3, wherein said three-phase PWM rectifier battery charger control algorithms in Mode 5 control library converting AC grid power to storage battery power further comprises:
 a battery voltage controller regulating battery voltage by generating a inverter power command in constant voltage mode;
 a battery current controller regulating battery current by generating an inverter power command in constant current mode;
 an AC current reference generation unit producing an AC current reference with the inverter power command from either the battery voltage controller or the battery current controller;
 an AC current controller regulating AC current based on the AC current reference by generating a PWM command voltage, and
 a SVM modulator generating PWM signals based on the PWM command voltage.

8. The solar energy converter with built-in high-power battery charger/discharger system of claim 4, wherein the interleaved multi-phase battery charging control algorithms in Mode 1 control library further comprises:
 a structure of single layer current control loop for constant current mode with the current reference Impr generated by an optimal solar power tracking unit to ensure the maximum battery charging current, and
 a two layers cascade control loop structure for constant voltage mode with a battery voltage loop as the outer loop and a current loop as the inner loop.

9. The solar energy converter with built-in high-power battery charger/discharger system of claim 5, wherein three-phase grid-tied inverter plus direct battery charging control algorithms Mode 2 control library further comprises:

a two layers cascade control loop structure with a DC voltage control loop as the outer loop and an AC current loop as the inner loop.

10. The solar energy converter with built-in high-power battery charger/discharger system of claim 1, wherein said operation switches are operated based on an operation mode switch control table.

11. The solar energy converter with built-in high power battery charger/discharger of claim 1, wherein said operation mode 1 further comprises a hardware configuration of interleaved multi-phase super charger and software function of Mode 1 control library.

12. The solar energy converter with built-in high power battery charger/discharger of claim 1, wherein said operation mode 2 further comprises a hardware configuration of three-phase grid-tied inverter plus direct battery charger and software function of Mode 2 control library.

13. The solar energy converter with built-in high power battery charger/discharger of claim 1, wherein said operation mode 3 further comprises a hardware configuration of three phase grid-tied inverter and software function of Mode 3 control library.

14. The solar energy converter with built-in high power battery charger/discharger of claim 1, wherein said operation mode 4 further comprises a hardware configuration of three phase solar/storage battery discharger and software function of Mode 4 control library.

15. The solar energy converter with built-in high power battery charger/discharger of claim 1, wherein said operation mode 5 further comprises a hardware configuration of three phase PWM rectifier battery charger and software function of Mode 5 control library.

16. The solar energy converter with built-in high power battery charger/discharger of claim 1, wherein solar power extension software in MFPCS comprises the steps of:
calculating an output power $P_S$ of solar power source, a load power $P_L$, a State of Charge (SOC) of battery power source;
sensing an output voltage $V_{MP}$ of solar power source, a terminal voltage $V_B$ of battery power source;
determining on peak-hour/off peak-hour periods in accordance with time of the day; and
performing comparison logic operations of SOC of battery power source and its minimum/maximum values, output power of solar power source and load power, voltage of solar power source and terminal voltage of battery power source.

17. The solar energy converter with built-in high power battery charger/discharger of claim 1, wherein solar power extension software in MFPCS further comprises the steps of:
setting Mode=1 when $V_{MP}$ is less than $V_B$, battery is within normal range and $P_S$ is greater than $P_L$, or when $V_{MP}$ is less than $V_B$ and battery is fully discharged;
setting Mode=2 when $V_{MP}$ is greater than $V_B$, battery is within normal range and $P_S$ is greater than $P_L$, or when $V_{MP}$ is greater than $V_B$ and battery is fully discharged;
setting Mode=3 when Ps is greater than $P_L$, battery is within normal range and during off peak-hour period, or when Ps is greater than $P_L$ and battery is fully charged;
setting Mode=4 when in on peak-hour period, battery is within normal range and $P_S$ is greater than $P_L$, or when in off peak-hour period, battery is fully charged;
setting Mode=5 when $P_S$=0, during off peak-hour period and battery needs charge.

18. A solar power conversion system (PCS) with built-in high power storage battery charger/discharger with a solar power extension method comprises:
the Multi-Function Power Conversion System (MFPCS) operated in a selected one of at least five (5) operation modes: a interleaved multi-phase super charger mode, a three-phase grid-tied inverter plus direct battery charger mode, a three-phase grid-tied inverter mode, a three-phase solar/battery power discharger mode, a three-phase pulse width modulation (PWM) rectifier battery charger mode;
the solar power extension software with the steps of:
calculating a output power $P_S$ of a solar power source, a load power $P_L$ and a State of Charge (SOC) of a battery power source;
determining on peak-hour/off peak-hour periods in accordance with time of the day;
sensing an output voltage $V_{MP}$ of a solar power source, a terminal voltage $V_B$ of a battery power source;
performing logic comparison operations of SOC, $P_S$ and $P_L$, $V_{MP}$ and $V_B$, selecting operation mode;
setting battery charging power reference and inverter power reference based on logic comparison operations; and
performing control functions according to the selected operation mode and power references.

* * * * *